United States Patent [19]

Huang

[11] Patent Number: 4,885,940
[45] Date of Patent: Dec. 12, 1989

[54] COMPACT PRESSURE GAUGE

[76] Inventor: Tien-Tsai, Huang, No. 4, Lane 30, Wu-Chuan Street, Pan-Chiao, Taiwan

[21] Appl. No.: 312,203

[22] Filed: Feb. 21, 1989

[51] Int. Cl.⁴ ............................................... G01L 7/16
[52] U.S. Cl. .......................................... 73/744; 73/756
[58] Field of Search ................ 73/744, 146.8, 711, 73/756

[56] References Cited

U.S. PATENT DOCUMENTS

| 4,742,714 | 5/1988 | Huang | 73/146.8 |
| 4,785,670 | 11/1988 | Huang | 73/744 |

Primary Examiner—Donald O. Woodiel
Attorney, Agent, or Firm—Bacon & Thomas

[57] ABSTRACT

A pressure gauge includes an air cylinder which is accommodated within the cylindrical chamber of a body, and an indicating needle which can rotate in a plane generally parallel to the cylinder. A U-shaped piston rod has a first arm extending into the cylinder, and a second arm having a rack surface generally parallel to the first arm. A pinion is secured to a rotating shaft and meshes with the rack so as to rotate the rotating shaft. The indicating needle is secured to the rotating shaft. The cylinder has an axially extending slot formed in the inner surface thereof in communication with the straight intake passage of the pressure gauge and a sealed space defined in the chamber by the piston of the cylinder. The intake passage is generally parallel to the rotating shaft so as to communicate with a horizontal tube which is to be measured. An adjustable member is externally threaded so as to engage with the internally threaded lower end of the cylinder. When an outer housing is removed from the body, the adjustable member may be rotated by a tool so as to adjust the biasing force of a spring which is applied on the piston.

4 Claims, 3 Drawing Sheets

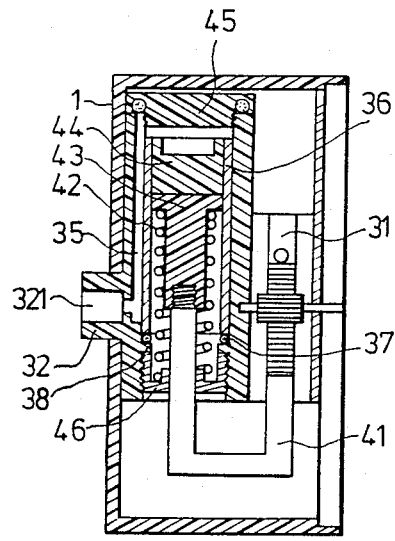
F I G. 4
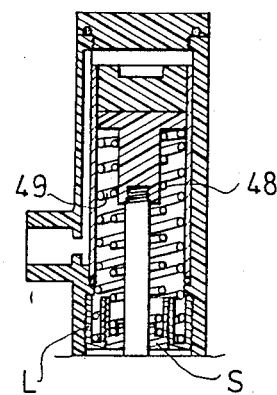
F I G. 5

COMPACT PRESSURE GAUGE

BACKGROUND OF THE INVENTION

The invention relates to a pressure gauge, more particularly to a compact pressure gauge which is easily manufactured and adjusted.

To achieve a convenient reading when measuring the air pressure in a horizontal tube, I disclosed, in my U.S. Pat. No. 4,785,670, a pressure gauge as shown in FIG. 1 which has a body A, an adapter B with a horizontal intake passage B1, and an outer housing C with a central hole C1. The body A has a central bore E which is sealed by engaging threadably the upper end of the body A with an externally threaded cap A1. To intercommunicate the intake passage B1 of the adapter B and the central bore E of the body A, the body A is drilled to form gas passages E1, E2. The upper end of the passage E1 is sealed by engaging threadably the body A with a bolt A2. The formation of the passages E1, E2 increases the volume of the pressure gauge and makes the manufacture of said pressure gauge more difficult and time-consuming. To reduce the volume of the pressure gauge, I disclosed, in my U.S. Pat. No. 4,742,714, a compact pressure gauge as shown in FIG. 2, which is characterized by a U-shaped piston rod F. As illustrated, the compact pressure gauge includes an abutment element H which is engaged threadably with the left arm of the piston rod F. Although the pressure gauge of FIG. 2 has a smaller volume, it is difficult to adjust the biasing force of a spring G. In particular, to adjust the biasing force of the spring G, several parts must be removed from the pressure gauge so as to rotate the abutment element H relative to the piston rod F by engaging the screwdriver hole of the upper end surface of the abutment element H with the head of a screwdriver.

SUMMARY OF THE INVENTION

It is therefore the main object of this invention to provide a compact pressure gauge which is easily manufactured and adjusted.

According to this invention, a pressure gauge includes an air cylinder which is accommodated within the cylindrical chamber of a body, and an indicating needle which can rotate in a plane generally parallel to the cylinder. A U-shaped piston rod has a first arm extending into the cylinder, and a second arm having a rack surface generally parallel to the first arm. A pinion is secured to a rotating shaft and meshes with the rack so as to rotate the rotating shaft. The indicating needle is secured to the rotating shaft. The cylinder has an axially extending slot formed in the inner surface thereof in communication with the straight intake passage of the pressure gauge and a sealed space defined in the chamber by the piston of the cylinder. The intake passage is generally parallel to the rotating shaft so as to communicate with a horizontal tube which is to be measured. An adjustable member is externally threaded so as to engage with the internally threaded lower end of the cylinder. When an outer housing is removed from the body, the adjustable member may be rotated by a tool so as to adjust the biasing force of a spring to the piston.

BRIEF DESCRIPTION OF THE DRAWINGS

Other features and advantages of this invention will become apparent in the following detailed description of the preferred embodiments of this invention, with reference to the accompanying drawings, in which:

FIG. 4 is a sectional view showing the pressure gauge of this invention; and

FIG. 5 a schematic view illustrating a modification to the pressure gauge of this invention.

DETAILED DESCRIPTION OF THE PREFERRED EMBODIMENTS

Figure 1:
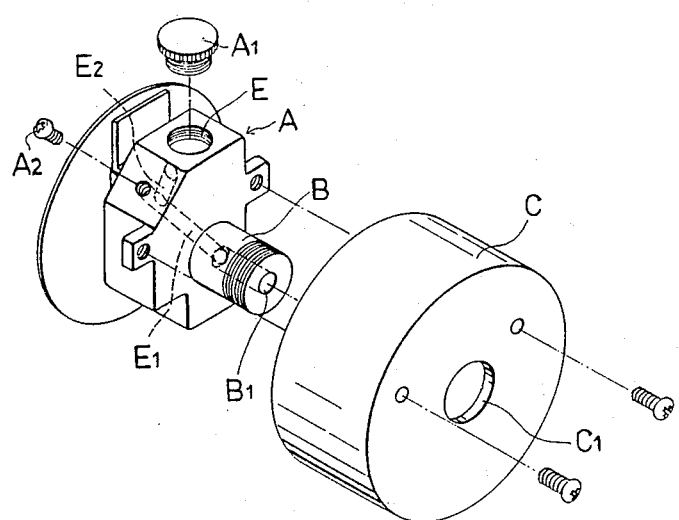
FIG. 1 is a partially exploded view of a conventional pressure gauge.
Figure 2:
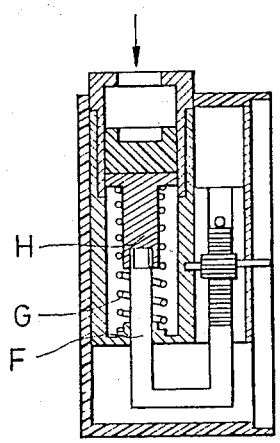
FIG. 2 is a sectional view of another conventional p gauge.
Figures 3, 3A:
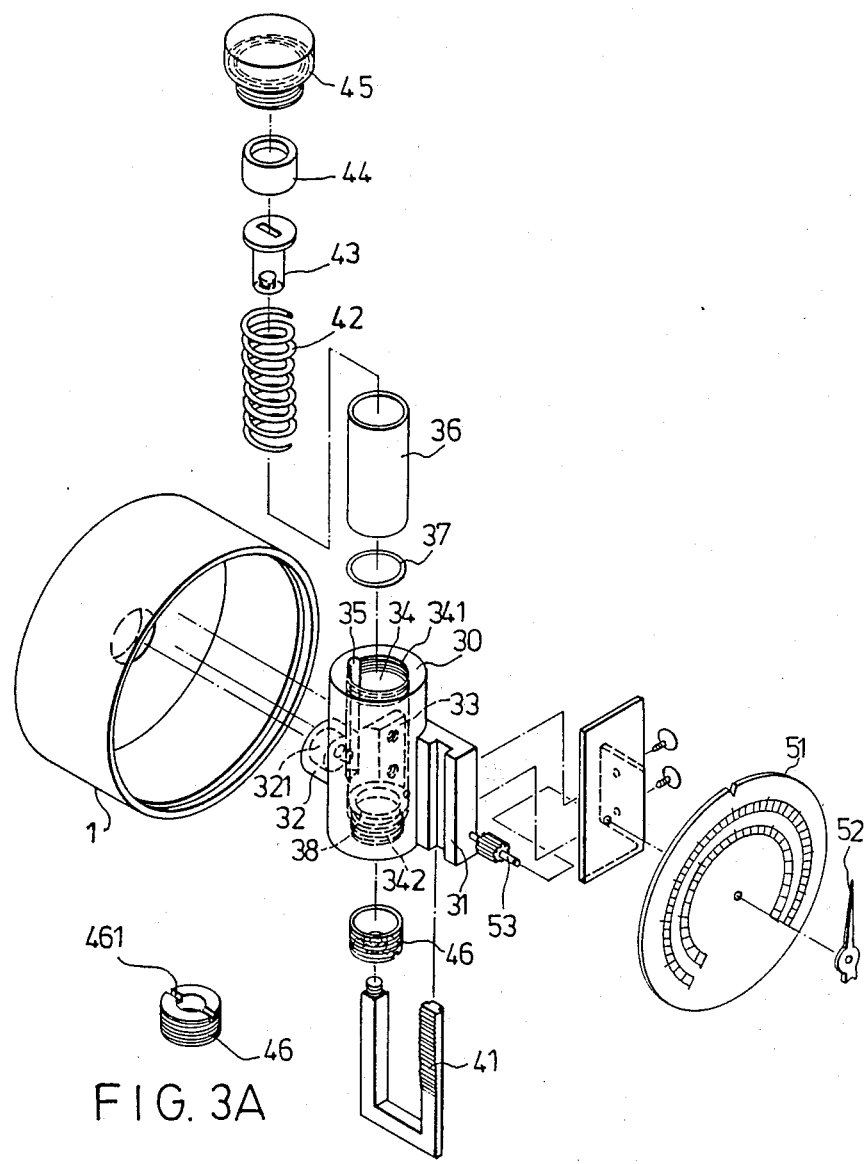
FIG. 3 an exploded view of a pressure gauge according to the invention.
FIG. 3A is a perspective view showing the adjustable member of the pressure gauge according to this invention.

Referring to FIGS. 3 and 4, like the driving mechanism of the pressure gauge shown in FIG. 3 of U.S. Pat. No. 4,785,670, the pressure gauge of this invention includes an outer housing 1, an air cylinder unit and a dial unit.

The air cylinder unit includes a cylindrical body 30 disposed within the outer housing 1, a channel member 31 secured to the right side of the body 30, an adapter 32 with a horizontal intake passage 321 secured to the left side of the body 30, and a mounting plate 33 secured to the back of the body 30. As illustrated, the mounting plate 33 has two threaded holes and the outer housing 1 has two holes, (not shown), aligned with said threaded holes so that the outer housing 1 can be screwed to the mounting plate 33. The body 30 has a central bore 34, an internally threaded upper end 341 sealed by an externally threaded cap 45, an internally threaded lower end 342 engaged with an adjustable member 46, and an axially extending slot 35 which is communicated with the intake passage 321. A cylinder 36 and a rubber washer 37 are placed within the central bore 34 of the body 34. An inward flange 38 is provided at the lower end portion of the body 30 so that the washer 37 may rest thereon. A space is defined in the central bore 34 of the body 30 above the cylinder 36 by a seal 44. The seal 44 is carried on the outward flange of an abutment element 43 which is engaged threadably with a U-shaped piston rod 41. A coiled compression spring 42 is provided within the cylinder 36 so as to bias the abutment element 43 to move upward.

The dial unit includes a dial plate 51, an indicating needle 52 and a rotating shaft 53 carrying the needle 52. The piston rod 41 can rotate the rotating shaft 53 by the engagement of a rack and a pinion in a known manner. The piston rod 41 is guided by a conventional means to move up and down.

Referring to FIG. 4, a space is left in the upper end portion of the central bore 34 of the body 30 above the cylinder 36 and is communicated with the slot 35 of the body 30 so that, when the intake passage 321 of the pressure gauge is communicated with a horizontal tube which is to be measured, the seal 44 and the piston rod 41 are moved downward. The linear movement of the piston rod 41 will be converted into the rotation of the indicating needle 52 in a known manner. Because this transfer of the motion is the same as that of U.S. Pat. No. 4,785,670, the detailed description thereof will be omitted.

It can be appreciated that the formation of the slot 35 of the body 30 makes the pressure gauge more compact, compared to a conventional pressure gauge suitable for measuring the air pressure of a horizontal tube.

Another feature of this invention lies in the adjustable member 46 which has a groove 461 in the bottom surface thereof, and a center hole through which one arm of the piston rod 41 extends. When adjustment of the biasing force of the spring 42 is desired, only the outer housing 1 needs be removed from the body 30. A pointed tool is then inserted upward into either end of the groove 16 so as to rotate the adjustable member 46 relative to the body 30. With the adjustable member 46 engaged threadably with the lower end of the body 30, the biasing force of the spring 42 is easily adjusted.

Referring to FIG. 5, in a case where two springs 48, 49 are provided within the cylinder so as to increase the push force to the piston, a large-diameter tubular element L and a small-diameter tubular element S are provided. The large-diameter tubular element L is engaged threadably with both the internally threaded lower end of the body and the small-diameter tubular element S. The piston rod extends through the small-diameter tubular element S. The small-diameter spring 48 is carried on the small-diameter tubular element S, while the large-diameter spring 49 is carried on the large-diameter tubular element L. Certainly, the bottom surfaces of the elements L, S may be formed with grooves in the bottom surfaces thereof in the same manner as that of the embodiment of FIG. 3A.

With this invention thus explained, it is apparent that numerous modifications and variations can be made without departing from the scope and spirit of this invention. It is therefore intended that this invention be limited only as indicated in the appended claims.

I claim:
1. A pressure gauge including:
an outer housing;
a body accommodated removably within said outer housing and having a straight intake passage;
a rotating shaft journalled in said outer housing including a pinion fixed on said rotating shaft, and an indicator secured to said rotating shaft for displaying rotational degree of said rotating shaft;
a cylinder, accommodated within said body, communicated with and perpendicular to said intake passage, having a piston and a U-shaped piston rod which has generally parallel first and second arms, said first arm extending into one end of said cylinder and said second arm being positioned outside said cylinder and including a rack secured to said second arm for meshing with said pinion of said rotating shaft;
means for guiding said second arm of said U-shaped piston rod to effect a rectilinear sliding movement in said outer housing;
a spring unit connected to said piston in said cylinder for biasing said piston against compressed gas pressure exerted on said piston;
characterized by said body having a sealed cylindrical chamber in which said cylinder is received in such a manner that said piston rod extends out of said chamber and a space is defined in one end of said chamber by the other end of said cylinder, and an axially extending slot formed in an inner surface of said body in communication with said intake passage and said space so as to move said piston when compressed air flows into said intake passage.

2. A pressure gauge as claimed in claim 1, wherein said body has an internally threaded lower end and an adjustable member engaged threadably with said lower end of said body, whereby, when said outer housing is removed from said body, said adjustable member may be moved in said body so as to vary biasing force of said spring unit which is applied on said piston.

3. A pressure gauge as claimed in claim 2, wherein said adjustable member has a groove formed in a bottom surface thereof, whereby, a tool may be inserted into said groove so as to rotate said adjustable member relative to said body.

4. A pressure gauge as claimed in claim 2, wherein said spring unit includes a first compression spring sleeved on said first arm of said piston rod, and a second compression spring surrounding said first compression spring, and wherein said adjustable member includes a large-diameter tubular element engaged threadably with said lower end of said body in alignment with said second compression spring for adjusting biasing force of said second compression spring, and a small-diameter tubular element engaged threadably with said large-diameter tubular element in alignment with said first compression spring for adjusting biasing force of said first compression spring, said first arm of said piston rod extending through said small-diameter tubular element.

* * * * *